United States Patent

Sanguinetti et al.

[11] Patent Number: 6,048,556
[45] Date of Patent: Apr. 11, 2000

[54] METHOD FOR MAKING A STUFFED PIZZA CRUST

[75] Inventors: Paul Sanguinetti, Antioch, Tenn.; Rick L. Nelson, Mead, Wash.; David M. Dungan, Xenia; Richard L. Hayward, Washington C.H., both of Ohio

[73] Assignee: Crestar Crusts, Inc., Northbrook, Ill.

[21] Appl. No.: 09/183,276

[22] Filed: Oct. 30, 1998

Related U.S. Application Data

[62] Division of application No. 08/897,593, Jul. 21, 1997, Pat. No. 5,865,107.

[51] Int. Cl.[7] ................................................. A21D 13/00
[52] U.S. Cl. .......................... 426/94; 426/274; 426/275; 426/283
[58] Field of Search .............................. 426/89, 94, 274, 426/275, 283, 289, 302, 523

[56] References Cited

U.S. PATENT DOCUMENTS

| | | | |
|---|---|---|---|
| 3,753,733 | 8/1973 | Bell | 426/275 |
| 4,283,431 | 8/1981 | Giordano et al. | 426/94 |
| 5,720,998 | 2/1998 | Proctor et al. | 426/94 |

*Primary Examiner*—Lien Tran
*Attorney, Agent, or Firm*—Knechtel, Demeur & Samlan

[57] ABSTRACT

A stuffed pizza crust includes a lower layer of an uncooked crust dough having a flanged peripheral edge, a upper layer of a baked crust having a peripheral edge, and a layer of an edible filling material disposed between the lower layer and the upper layer. The flanged peripheral edge of the lower layer is sealed with the peripheral edge of the upper layer, thereby encasing the layer of edible material therebetween. A method and apparatus for making the stuffed pizza crust is also provided.

6 Claims, 12 Drawing Sheets

METHOD FOR MAKING A STUFFED PIZZA CRUST

This Application is a Divisional of U.S. application Ser. No. 08/897,593, filed on Jul. 21, 1997 now U.S. Pat. No. 5,865,107.

TECHNICAL FIELD

The present invention is directed to a stuffed pizza crust, and more particularly, to a pizza crust having upper and lower crust layers with a layer of cheese or other edible filling material disposed therebetween.

BACKGROUND OF THE INVENTION

Although originally made entirely by hand in Italy, the manufacturing processes of today's technology allow a pizza to be made in large scale production assemblies, frozen or freeze-dried before packaging, and shipped to grocers nationwide. The pizza may be a completed prebaked pizza pie, having the customary prebaked pizza crust topped with a sauce, shredded cheese, and assorted vegetables or meats of choice, or the pizza may be supplied in the form of a pizza kit, having an unbaked crust provided along with containers of sauce and cheese for the consumer to build the pizza and then bake the same. In both instances, the pizza crust is generally flat, and the toppings on the pizza must be applied with moderation in order to prevent the same from overflowing the crust during the baking process.

To overcome this problem, the traditional pizza has also taken on new forms and new shapes made possible by an ever evolving technology. Circular pizza crusts may be provided with a flange or lip extending around the periphery thereof, thus creating an upstanding edge to prevent the overflow of any toppings. Not only does this apply to classic circular pizzas available in restaurants and grocer's freezers, but square and rectangular shaped pizzas have likewise become available with a flanged crust. Similarly, the folded over pizza, or calzone, has emerged as a more suitably-sized meal for one person having generally similar ingredients to the pizza. Although the folding over of the calzone crust theoretically prevents the overflow of the toppings therein, in practice the joining seams of the folded crust may not be sufficiently sealed to prevent the same. The simple hand-tossed pizza crust of the original pizzas has also developed, as shown in U.S. Pat. No. 5,405,627, into a two layer flanged crust capable of mass production through a plurality of crust templates and known press technology.

While each of the above pizza advances may further the production capabilities and/or conveniences for the consumer, the prior art has not developed a pizza capable of having increasing toppings, and thus, increasing the edible appeal for the consumer.

SUMMARY OF THE INVENTION

The present invention overcomes the disadvantages of the prior art by providing a stuffed pizza crust having a lower layer of an uncooked crust dough with a flanged peripheral edge, an upper layer of a baked crust with a peripheral edge, and a layer of an edible material disposed between the lower layer and the upper layer. The flanged peripheral edge of the lower layer is sealed with the peripheral edge of the upper layer to thereby encase the layer of edible material therebetween.

The present invention further provides a method of making the stuffed pizza crust. The method includes the steps of forming a first pizza crust within a pizza pan, applying a stuffing layer of an edible material over substantially the entire first pizza crust, and placing a second pizza crust over the layer of stuffing. The first pizza crust is formed by pressing a ball of dough into the pizza pan to form the first pizza crust with a lipped or flanged peripheral edge and the stuffing layer is distributed in a layer having a substantially even thickness. The stuffing layer is preferably shredded cheese, although any other type of edible material may of course also be utilized. The second crust is placed over the layer of stuffing and a peripheral edge of the second crust is sealed with the flanged edge of the first pizza crust.

In order to perform the method of making a stuffed crust pizza in accordance with the present invention, an apparatus is provided having a movable belt for conveying a pizza pan having at least one pizza pan cavity, where the pizza pan cavity contains a lower crust therein. The apparatus further includes mechanisms for applying a layer of edible filling material to the crust within each pizza pan cavity, placing a top crust on top of the lower crust such that the layer of filling is disposed therebetween, and sealing a peripheral edge of the top crust to a peripheral edge of the lower crust. The lower crust, the filling layer, and the top crust thus form the is stuffed pizza crust of the present invention.

BRIEF DESCRIPTION OF THE DRAWINGS

These, and other, objects, features and advantages of the present invention will become more readily apparent to those skilled in the art upon reading the following detailed description, in conjunction with the appended drawings, in which.

DETAILED DESCRIPTION OF A PREFERRED EMBODIMENT

Figure 1:
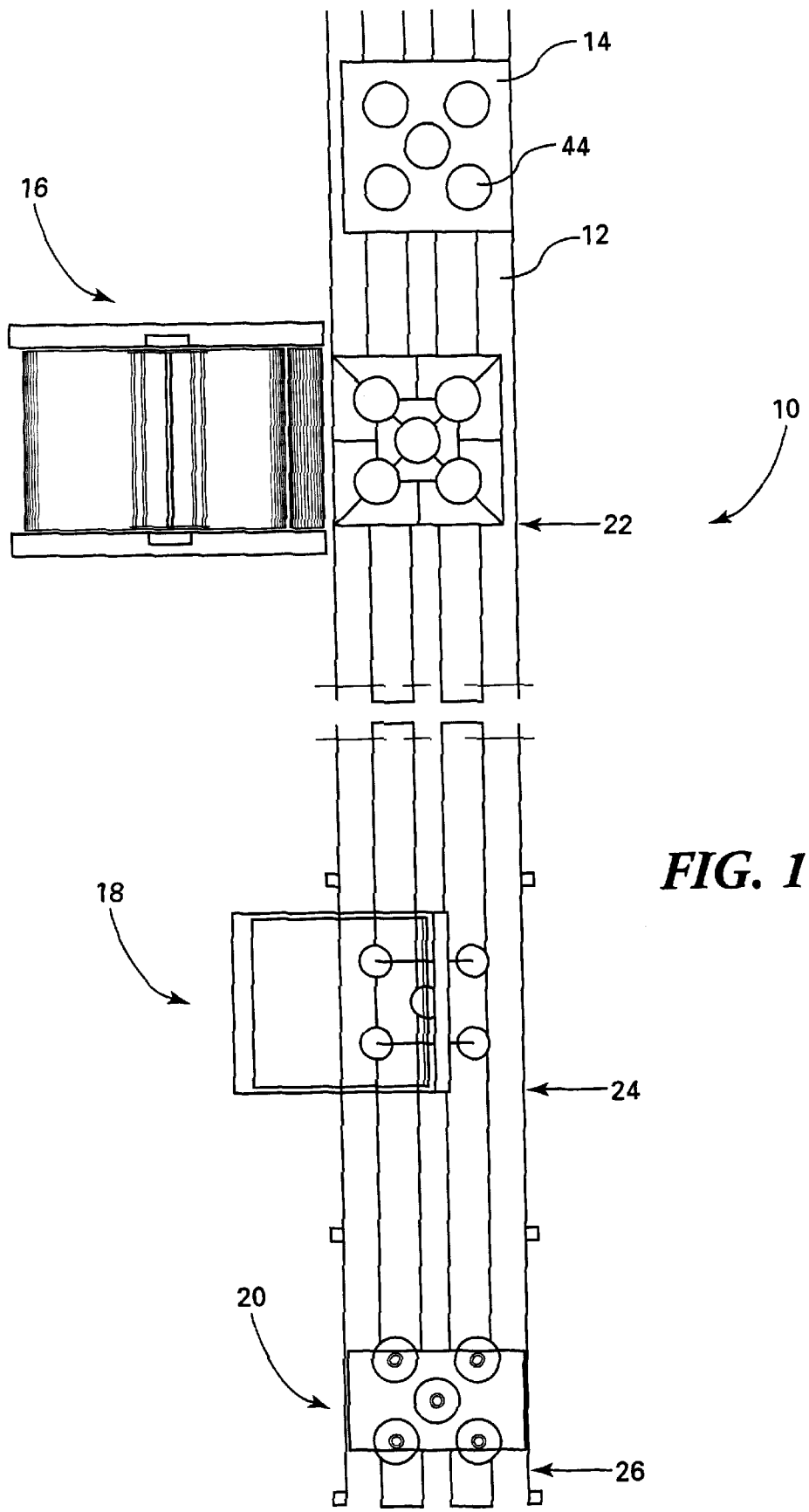
FIG. 1 is a schematic illustration of the process of making a stuffed crust pizza in accordance with the present invention.

Referring to FIG. 1, the stuffed crust apparatus of the present invention is shown generally by reference numeral 10. The apparatus 10 includes a movable conveyor belt 12 for sequentially conveying a pizza pan 14 having a plurality of pizza cavities to a filling applicator 16, a top crust placer 18, and a top crust tamper 20.

More particularly, the conveyor belt 12 moves the pizza pan 14 to a first pan stop location 22 immediately adjacent the filling applicator 16 in order for a layer of an edible filling material, such as cheese for example, to be disposed on a bottom crust already disposed within each of the cavities of the pizza pan 14. Following the application of the filling layer, the conveyor belt 12 moves the pizza pan to a second pan stop location 24 adjacent to the top crust placer 18. At the second pan stop location 24, a top crust is disposed on top of the layer of stuffing that is covering the bottom crust within each of the cavities of the pizza pan 14. After the top crust is disposed within the pizza pan, the conveyor belt 12 advances the pizza pan to a third pan stop location 26 disposed below the top crust tamper 20. The top crust tamper 20 utilizes a tamping element 28 to seal together the peripheral edges of the bottom crust and the top crust, thereby substantially encasing a filling layer of an edible material, such as a layer of cheese, therebetween. Each of the pizza stop locations and the activity transpiring thereat is more fully explained below with reference to the additional figures.

The pizza pan 14 utilized in the present invention preferably includes a plurality of cavities 44, each for forming an individual pizza having a peripheral lip or flange. The pizza pan 14 of the illustrated embodiment has an overall dimension of approximately thirty-three and one-third inches by thirty-three and one-third inches, and includes five generally circular pizza cavities each having an approximately eleven inch diameter. Although the illustrated pizza pan 14 includes five pizza cavities 44 having a round shape, it should be apparent to one skilled in the art that the present invention may be modified to accommodate any specific size of pizza pan and any shape and number of pizza cavities.

Each of the cavities 44 of the pizza pan is preferably provided with a cold pressed dough ball prior to progressing to the first pan stop location 22. The ball of pizza dough is pressed into each cavity of the pizza pan using a flanged or lipped crust die and cold press technology, as known in the prior art, to thereby form a bottom crust. The preferably unbaked bottom crust has a preferred thickness of approximately one-quarter inch along the planar bottom surface thereof and a preferred thickness of approximately three-quarters inch along the flanged peripheral edge thereof.

Figure 2:
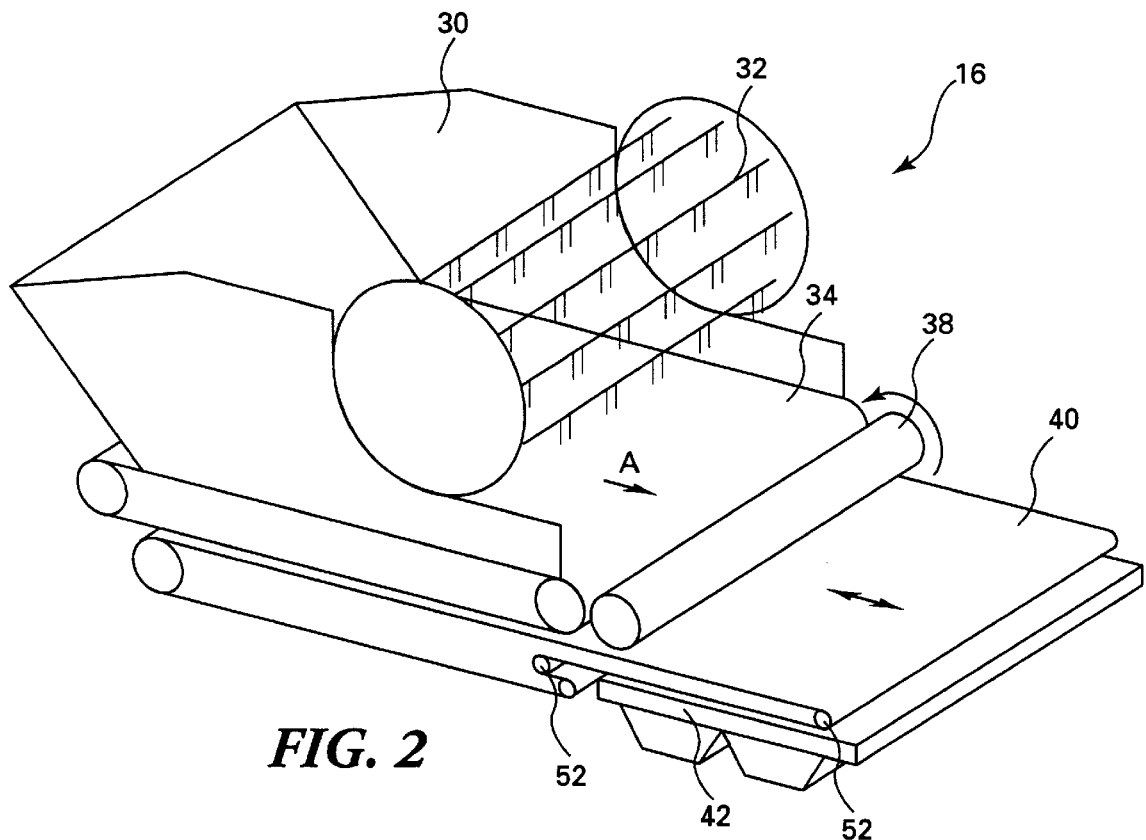
FIG. 2 is a perspective schematic illustration of a cheese applicator in accordance with the present invention.

Referring also to FIG. 2, the applicator 16 includes a hopper 30 containing the edible filling material to be applied, such as shredded cheese for example. The hopper 30 is disposed above a product belt 34 and a continuously rotating rake reel 32 is used to rake the shredded cheese or other filling into a uniform layer as the product belt 34 moves in a forward direction, as indicated by arrow A.

From the product belt 34, the shredded cheese or other filling passes over the edge of the moving belt 34 onto an extending retractable drop belt 40. The retractable drop belt 40 moves from the retracted position shown in FIG. 4 to the extended position shown in FIG. 3.

Figure 5:
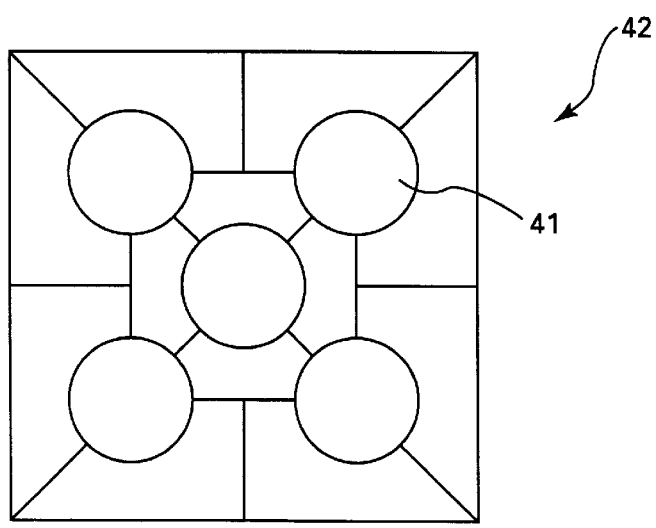
FIG. 5 is a top plan schematic illustration of a funnel mask in accordance with the present invention.
Figure 6:
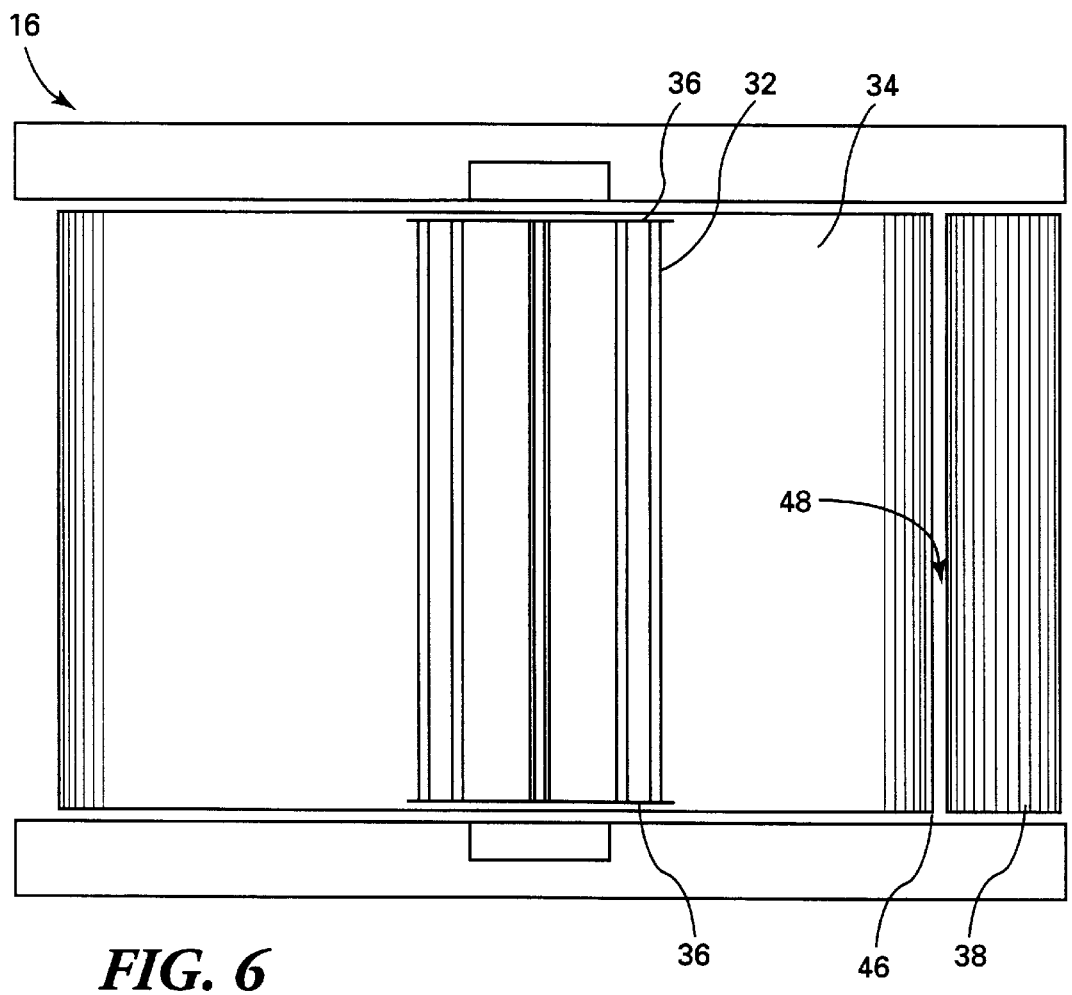
FIG. 6 is a top plan schematic illustration of the cheese applicator shown in FIG. 2.
Figure 7:
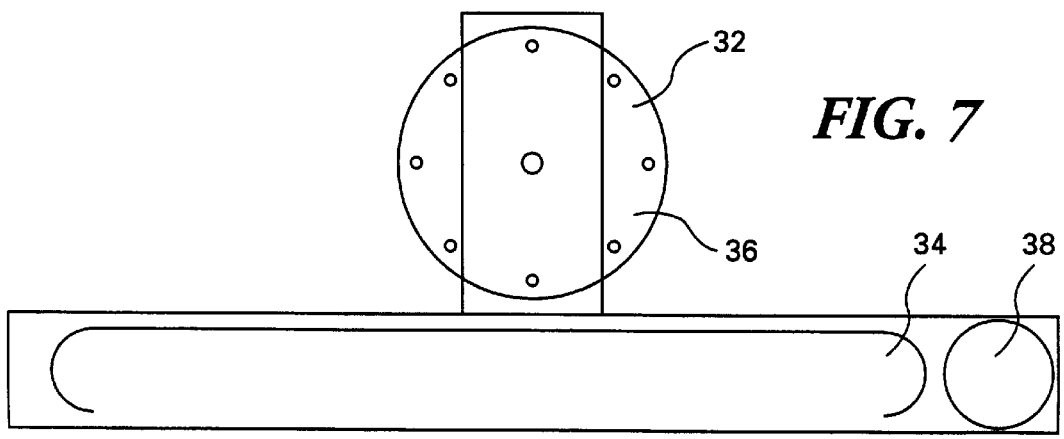
FIG. 7 is a side schematic illustration of the cheese applicator shown in FIG. 2.

A funnel mask 42, shown in FIG. 5, is disposed below the drop belt 40 to guide or otherwise funnel the shredded cheese deposited on the drop belt 40 into the cavities 44 of the pizza pan 14, as explained in greater detail below. The configuration of the funnel mask 42 therefore coincides with the configuration of the cavities of the pizza pan 14. For the illustrated embodiment, funnel mask 42 includes five generally circular funnel openings 41. As shown in FIG. 6, paddles 36 are preferably disposed on each side of the rake reel 32 in order to remove cheese from the edges of the product belt 34 and restrict the width of the cheese layer being deposited to within the edges of the funnel mask 42 and the cavities 44 to be filled.

The retractable drop belt 40 is mounted on one-way bearings that are activated by a linear actuator or positioner. When the drop belt 40 moves forward, the product belt 34 also begins to move forward, thereby depositing an even layer of the shredded cheese onto the retractable drop belt 40. The amount of shredded cheese or other edible filling material per square inch of drop belt 40 is regulated by adjusting the speed of the product belt 34 and by adjusting the height of the rake reel 32. In particular, these adjustments of the cheese applicator 16 are made first in order to obtain the desired amount of cheese to be deposited in a center one of the cavities 44. The amount of cheese deposited in the outer cavities 44 (those farthest from the hopper 30) would be adjusted by modifying the forward stop position of the linear actuator. The amount of cheese deposited in the inner cavities 44 (those nearest to the hopper 30) would be adjusted by modifying the retracted stop position of the linear actuator. Adjustments of the amount of cheese between the leading and trailing cavities 44 (relative to their movement on the movable conveyor belt 12) may be accomplished by modifying the width defined between the paddles 36 mounted on the rake reel 32.

Referring also to FIG. 6, a counter rotating roller 38 is disposed adjacent to the forward edge 46 of the product belt 34 and thus defines a drop zone 48 therebetween into which the shredded cheese will fall to the drop belt 40. The counter rotation of the roller 38 assists in directing the shredded cheese from the product belt 34 into the drop zone 48.

Figure 3:
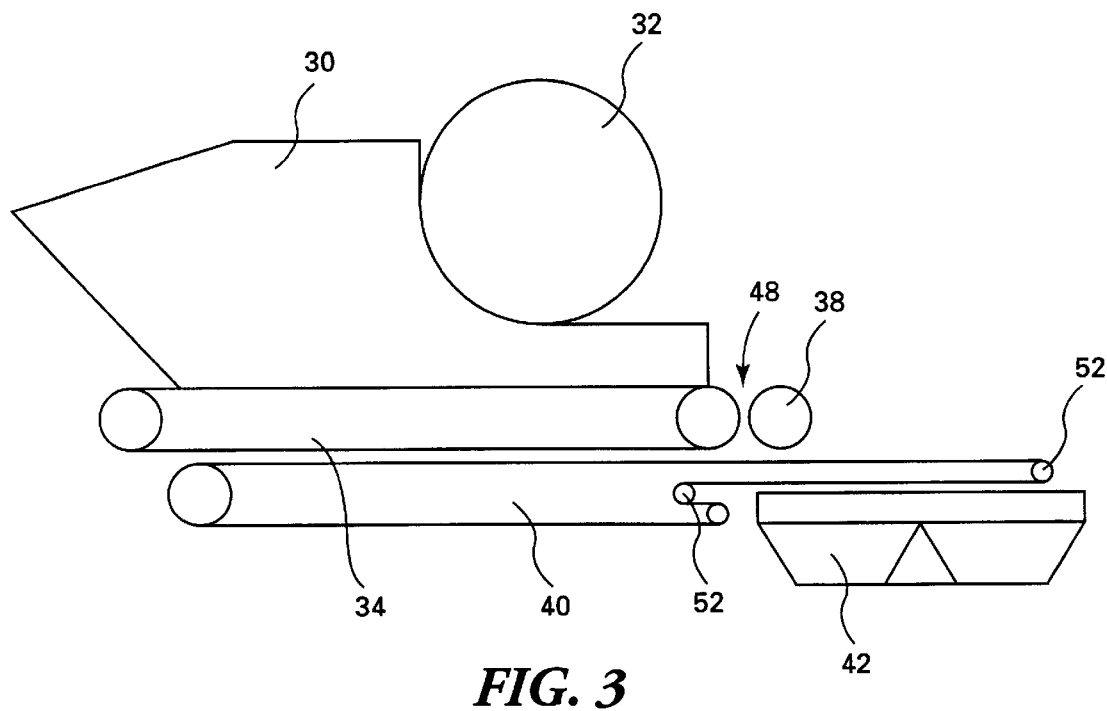
FIG. 3 is a side schematic illustration of a retractable drop belt in an extended position in accordance with the present invention.
Figure 4:
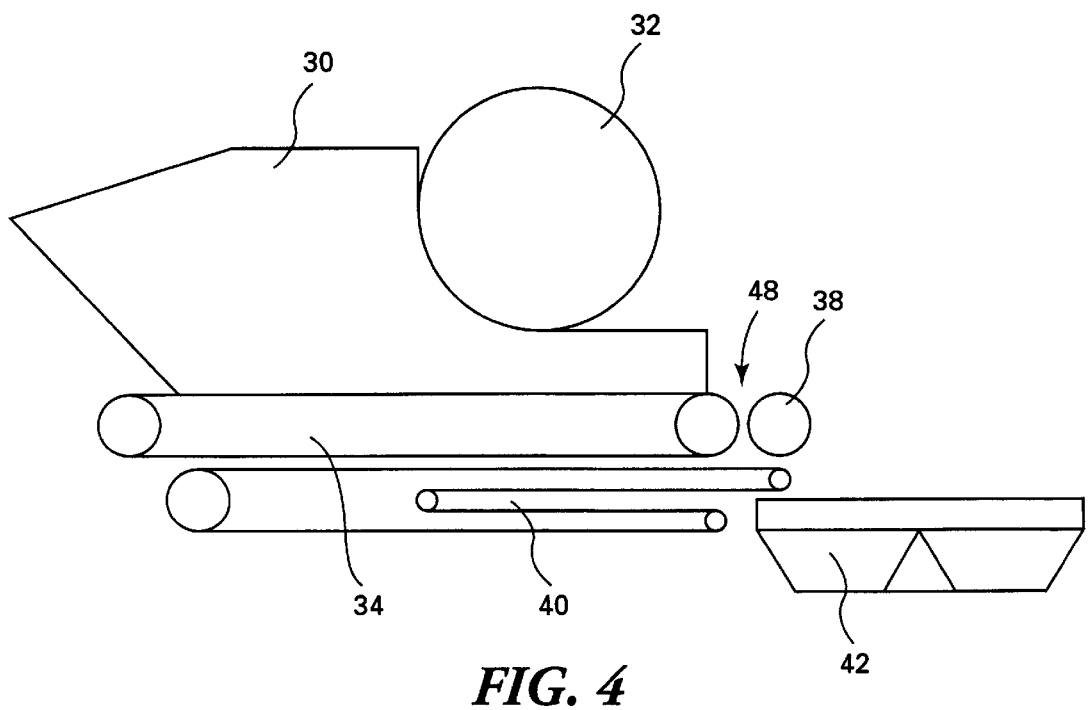
FIG. 4 is a side schematic illustration of the retractable drop belt of FIG. 3 shown in a retracted position.

When the shredded cheese reaches the outer edge of the funnel mask 42, which substantially corresponds to the shredded cheese covering the drop belt 40 in the extended position of FIG. 3, both the product belt 34 and the retractable drop belt 40 stop moving until the pizza pan 14 is indexed into the first pan stop location 22. When the pan 14 is properly located in place, the drop belt 40 retracts on the one-way bearings 52 supporting the surface thereof. The bearings 52 are designed to rotate in only one direction when the drop belt 40 is retracting, and lock in the other direction when the drop belt 40 is extending. As a result, as the retractable belt 40 is retracting, the belt surface of the drop belt 40 remains stationary, thereby causing the cheese on the surface of the drop belt 40 to drop off the end thereof and into the funnel mask 42 mounted therebelow between the drop belt 40 and the pizza pan 14. The funnel mask 42 then directs the cheese through the funnels and into the cavities 44 of the pizza pan disposed therebelow.

When the drop belt 40 reaches the end of the retract stroke as shown in FIG. 4, it again begins its forward stroke. At this time, the product belt 34 is also started which results in an even layer of shredded cheese or other edible filling material being deposited from the product belt 34 to the drop belt 40. While the drop belt 40 is extending during its forward stroke, the pizza pan 14 is released from the first pan stop location 22 and moves toward a second pan stop location 24 while a new pizza pan will move toward the first pan stop location 22 now vacated by the pizza pan 14.

Figure 9:
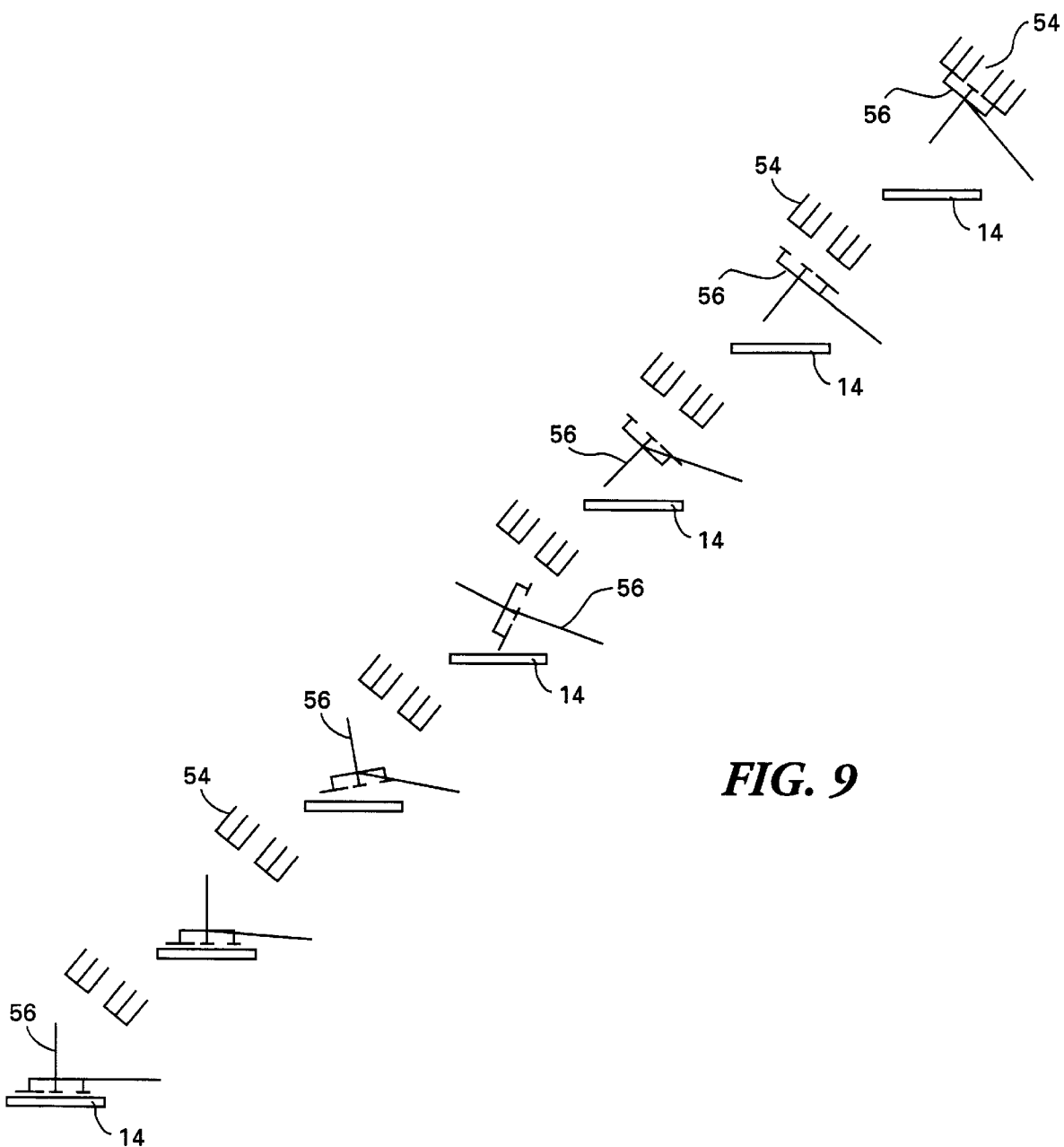
FIG. 9 is a diagrammatic illustration of the operation of the top crust placer shown in FIG. 8.
Figure 15:
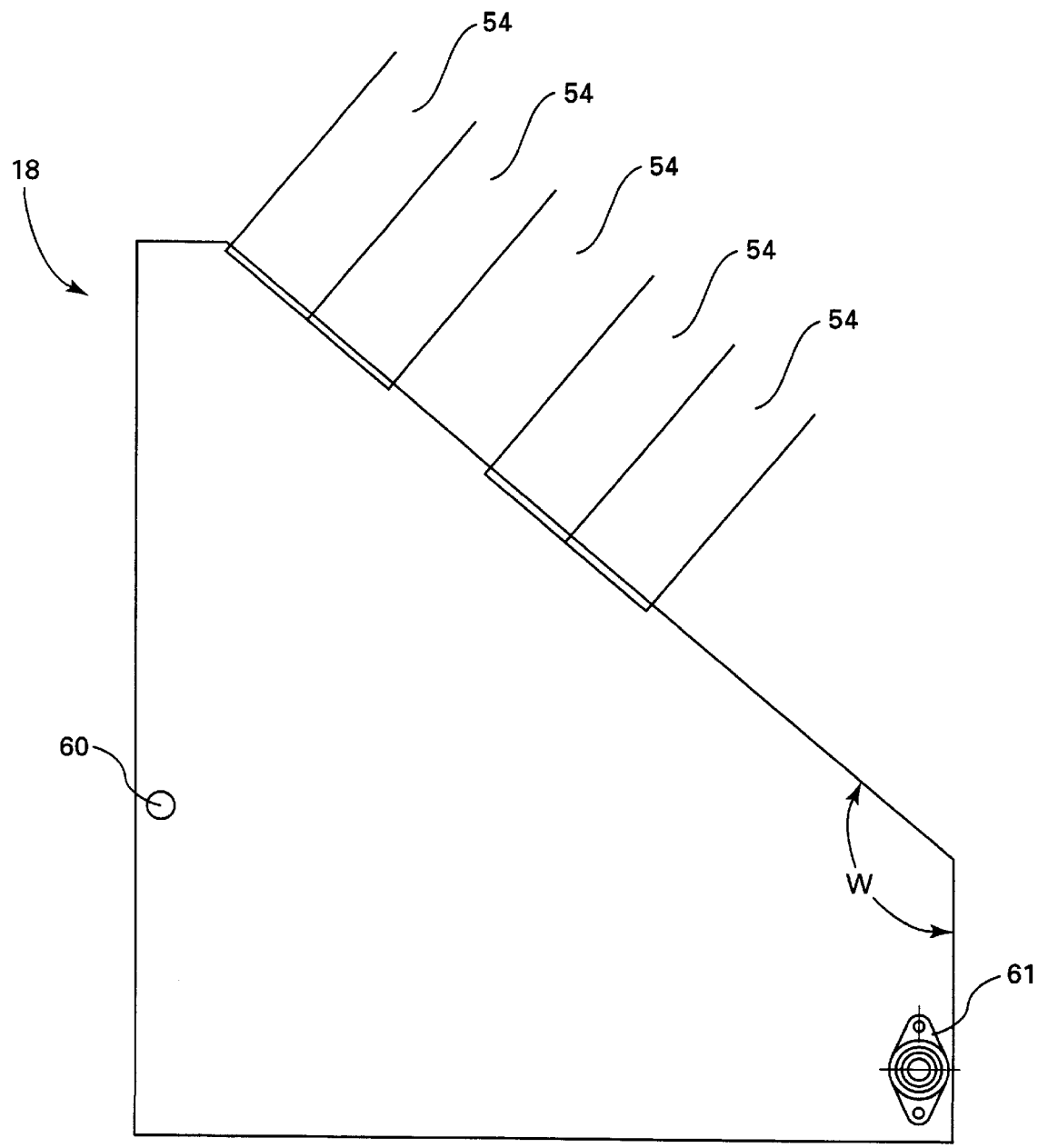
FIG. 15 is a side schematic illustration of the top crust placer shown in FIG. 8.

After leaving the cheese applicator 16, the pizza pan 14 is indexed to a second pan stop location 24 disposed adjacent to the top crust placer 18. Referring also to FIG. 15, a stack of prebaked pizza crusts, preferably thin prebaked crusts, are stored in a crust magazine 54. The prebaked top crusts have a generally planar surface with a thickness of approximately one-sixth inch (or five millimeters). A separate crust magazine 54 is provided for each cavity 44 of the pizza pan 14. A placement mechanism 56 is utilized for removing a crust from each magazine 54 and placing the crusts in the cavities 44 of the pizza pan, as diagrammatically shown in FIG. 9, thereby covering the layer of shredded cheese or other filling that was deposited by the cheese applicator.

Figure 8:
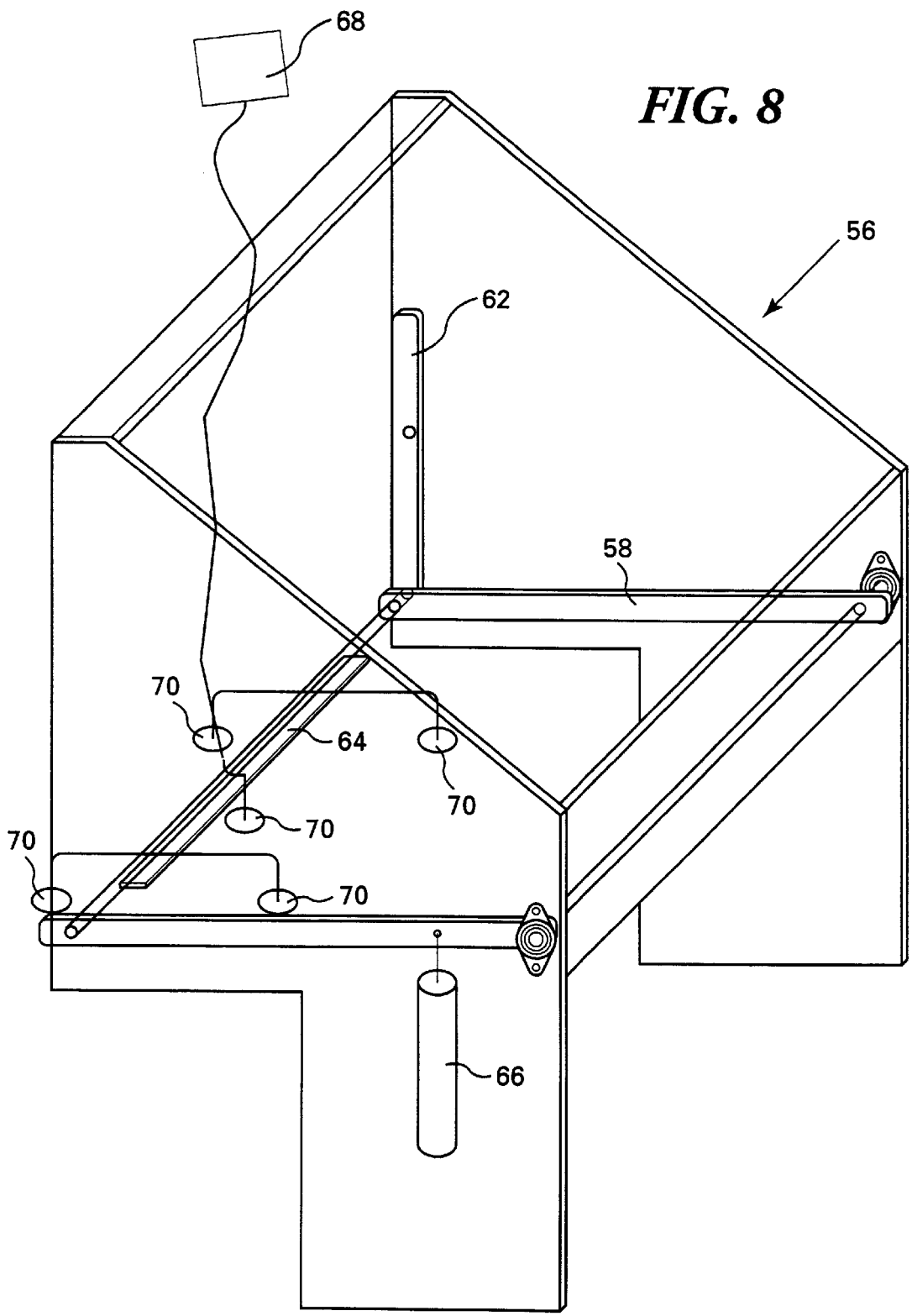
FIG. 8 is a perspective schematic illustration of a top crust placer in accordance with the present invention.
Figure 14:
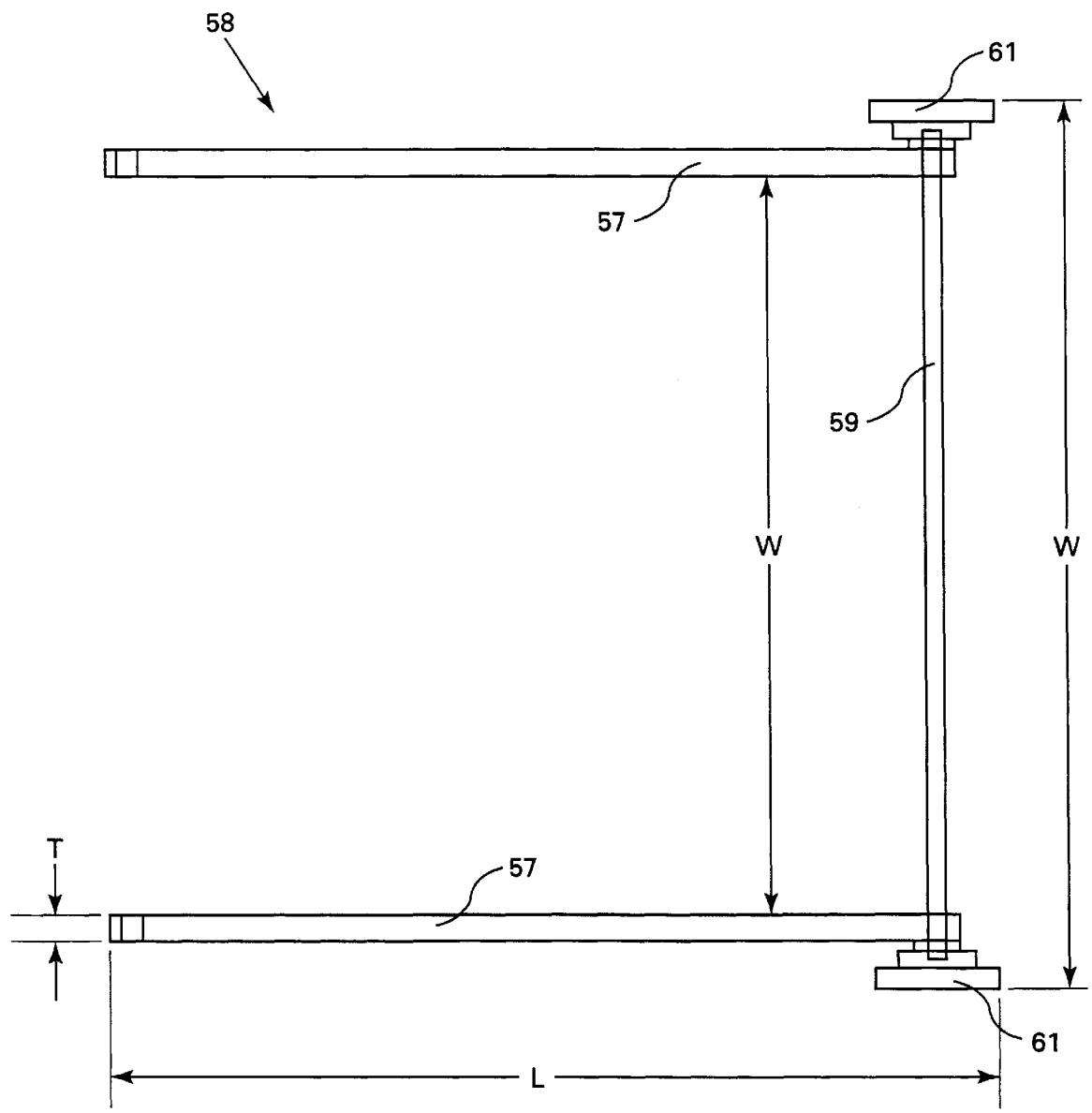
FIG. 14 is a top schematic illustration of a swing arm assembly in accordance with the present invention.

The placement mechanism 56, as best shown in FIG. 8, includes a swing arm assembly 58 having a rotating head assembly 64 mounted therewith. Referring also to FIG. 14, the swing arm assembly 58 includes two arms 57 mounted at each end 61 to the side plates of the housing for the placement mechanism 56. Extending between the opposing arms 57 is a connecting arm 59 about which the arms 57 pivot during the upward and downward strokes of the swing arm assembly 58. In the illustrated embodiment, each arm 57 has a length L of approximately thirty-eight inches and the connecting arm 59 has a width W of approximately thirty-eight and one-quarter inch to span the distance of approximately thirty-two inches between the arms 57. The thickness T of the arms 57 is approximately one inch for the illustrated embodiment.

Figure 11:
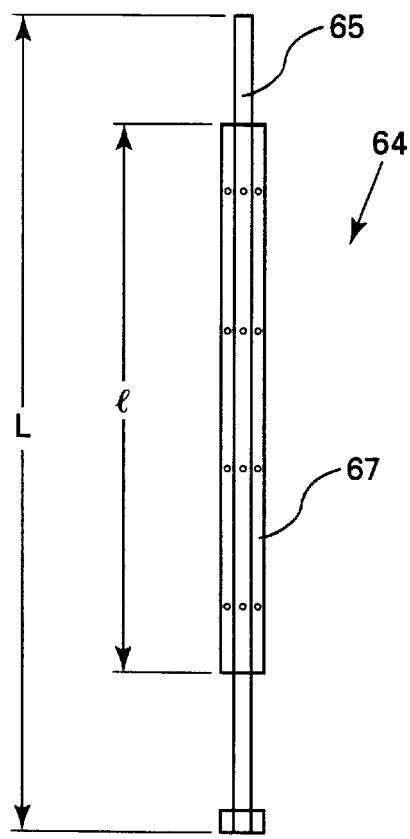
FIG. 11 is a top schematic illustration of a rotating head assembly in accordance with the present invention.
Figure 13:
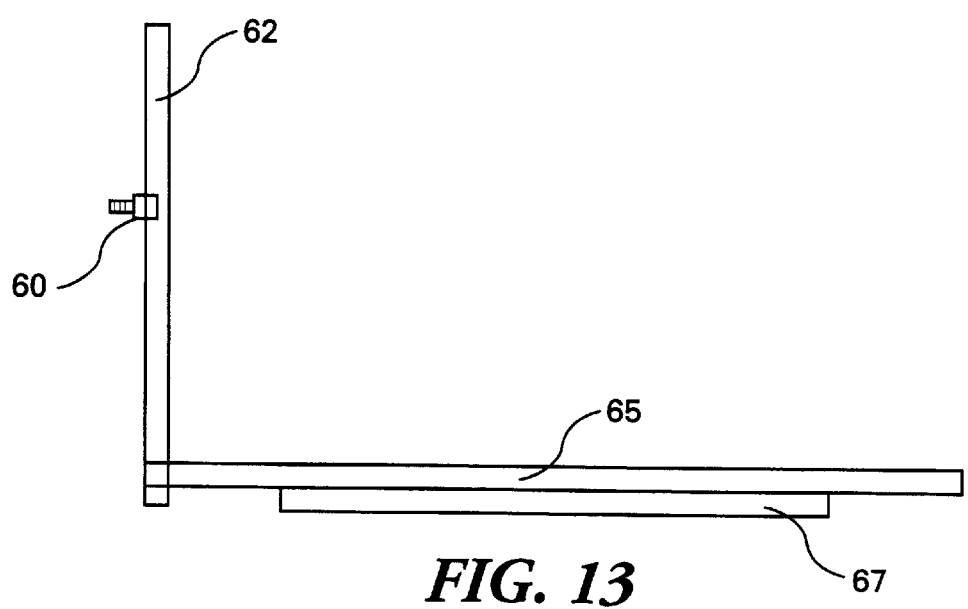
FIG. 13 is a side schematic illustration of the rotating head assembly shown in FIG. 11.

The rotating head assembly 64 is mounted between the opposing arms 57 of the swing arm assembly 58. Referring to FIG. 11, the rotating head assembly 64 includes a mounting bar 65, each end of which is attached to one of the arms 57. A rotating head 67 is disposed centrally along the mounting bar 65, as shown also in FIG. 13. The mounting bar 65 of the illustrated embodiment has a length L of approximately thirty-six inches and the corresponding rotating head 67 has a length l of approximately twenty-four inches.

Figure 10:
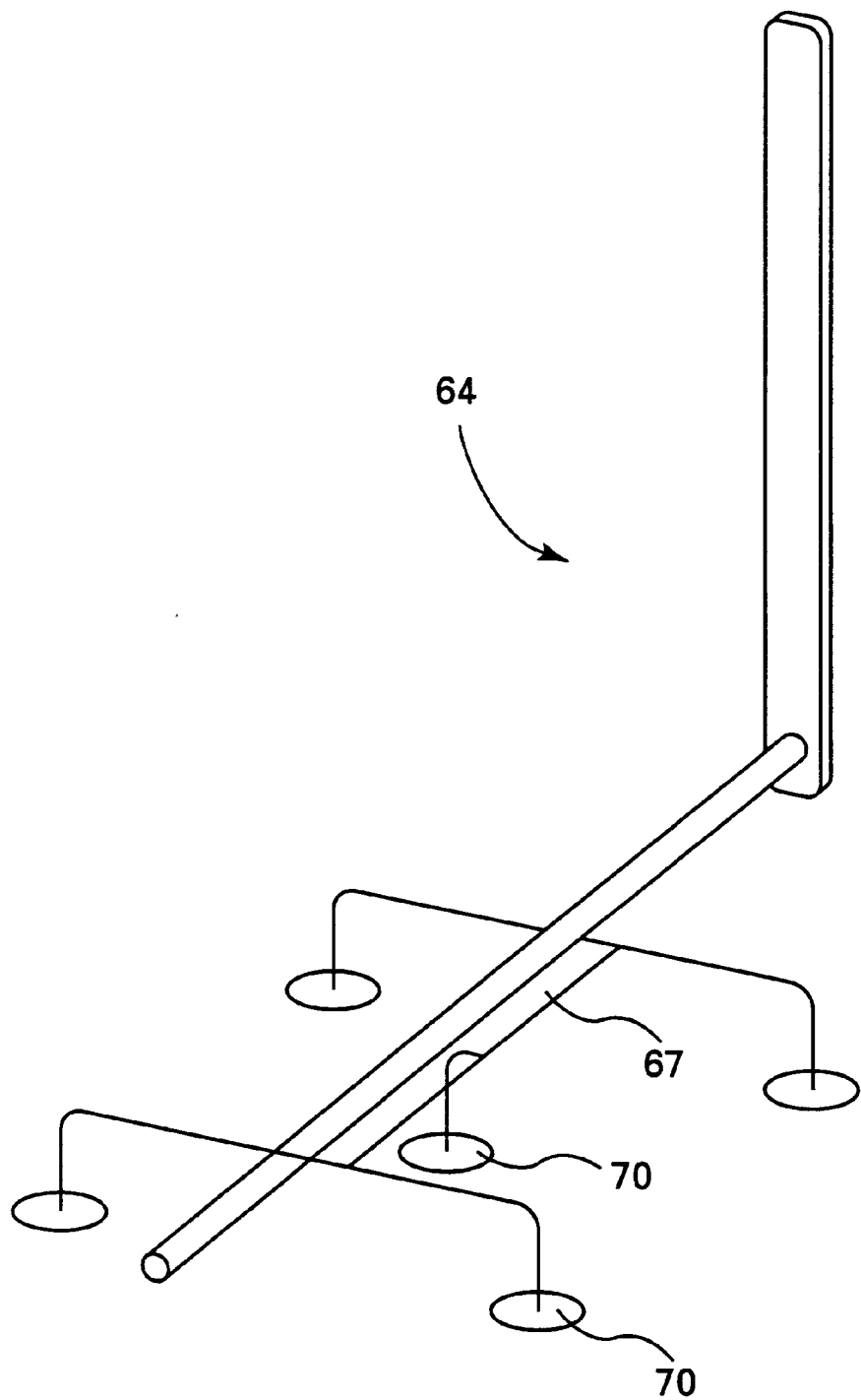
FIG. 10 is a perspective schematic illustration of the suction head assembly of the present invention.
Figure 12:
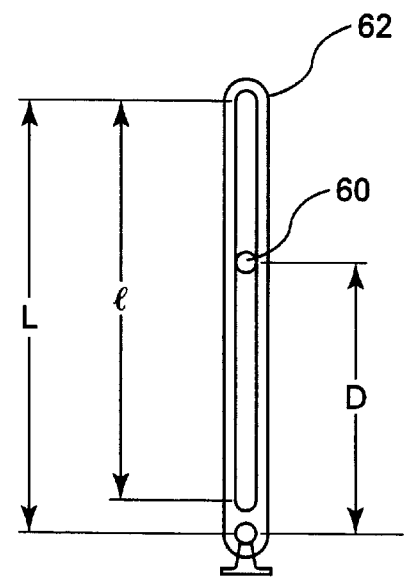
FIG. 12 is an end schematic illustration of the rotating head assembly shown in FIG. 11.

The rotating head assembly 64 also includes a plurality of suction heads 70, as best shown in FIG. 10, corresponding to the number of cavities 44 in the pizza pan. An air cylinder 66 raises the swing arm assembly upwards adjacent to the crust magazine 54, as diagrammatically shown in FIG. 9. As the swing arm 58 passes a fixed cam 60 mounted on a side plate of the placement mechanism 56. Referring also to FIG. 12, a cam follower 62 connected to the rotating head assembly 64 causes rotation of the rotating head 67 such that it is facing the crust magazine 54. The fixed cam 60 is disposed, in the illustrated embodiment, a distance D of approximately twelve inches upwards from the starting position of the swing arm assembly 58 for its upward stroke. The cam follower 62 has an outer length L of approximately nineteen inches and an inner length l of approximately seventeen and one-half inches.

At the top of the upward stroke of the swing arm assembly 58, a vacuum pump 68 is activated to supply a vacuum to the suction heads 70 of the rotating head. The vacuum thus created causes a crust from each of the magazine stack to be gripped by a respective one of the suction heads 70. On the downward stroke of the swing arm assembly 58, the crusts are pulled from the magazine 54. As the swing arm 58 again passes the fixed cam 60, the rotating head 64 is again rotated to be parallel to the pizza pan 14. The motion of the swing arm assembly 58 is stopped above the lip of the pizza pan 14 in order to permit the pan 14 to complete its travel to the second pan stop location 24.

When the pizza pan 14 is indexed into the second can stop location 24, the swing arm assembly continues its downward travel toward the pizza pan 14. When the swing arm assembly 58 reaches the lowermost point of its travel, a diverter valve (not shown) is actuated to reverse the flow of air from the vacuum pump such that the crusts held by the suction heads 70 of the rotating head are released into the cavities 44 of the pizza pan 14. The vacuum pump may then be turned off. A full stroke of the swing arm assembly 58 is, for the illustrated embodiment, approximately 129°, as shown by angle ω in FIG. 15. Afterwards, as the swing arm assembly begins another upward stroke, the pizza pan 14 is released to travel toward the third pan stop location 26, and a new pan proceeds to be indexed in the second pan stop location 24 just vacated by the pizza pan 14.

Figure 16:
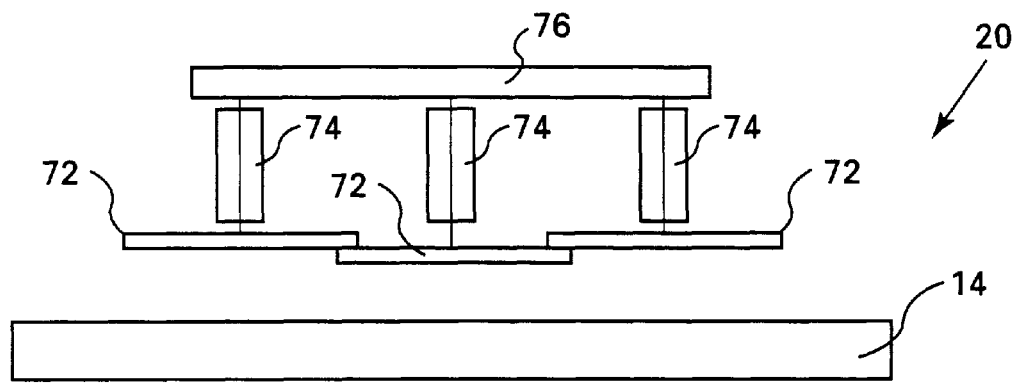
FIG. 16 is a side schematic illustration of a top crust tamper in accordance with the present invention.
Figure 17:
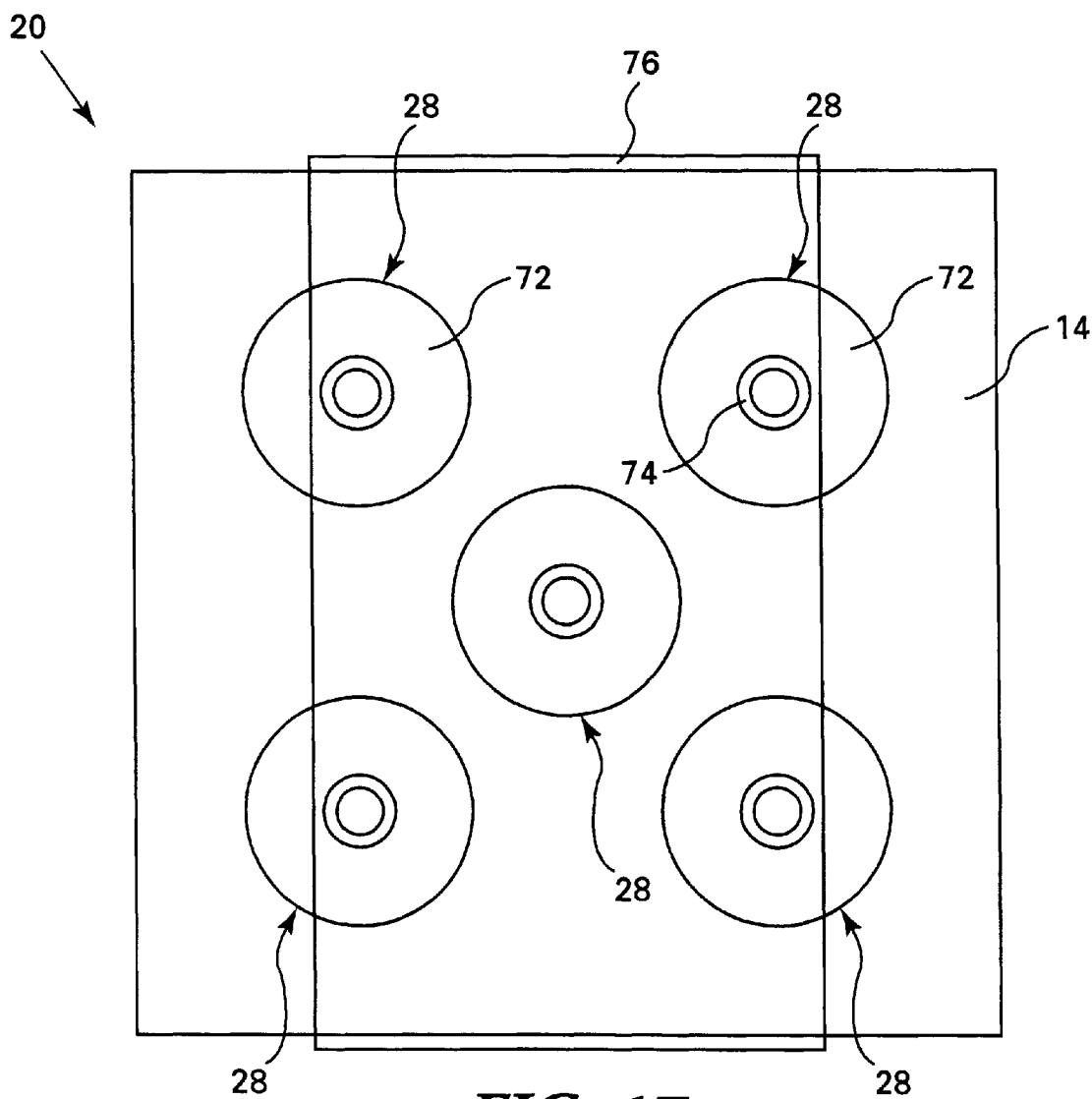
FIG. 17 is a top schematic illustration of the top crust tamper shown in FIG. 16.
Figure 18:
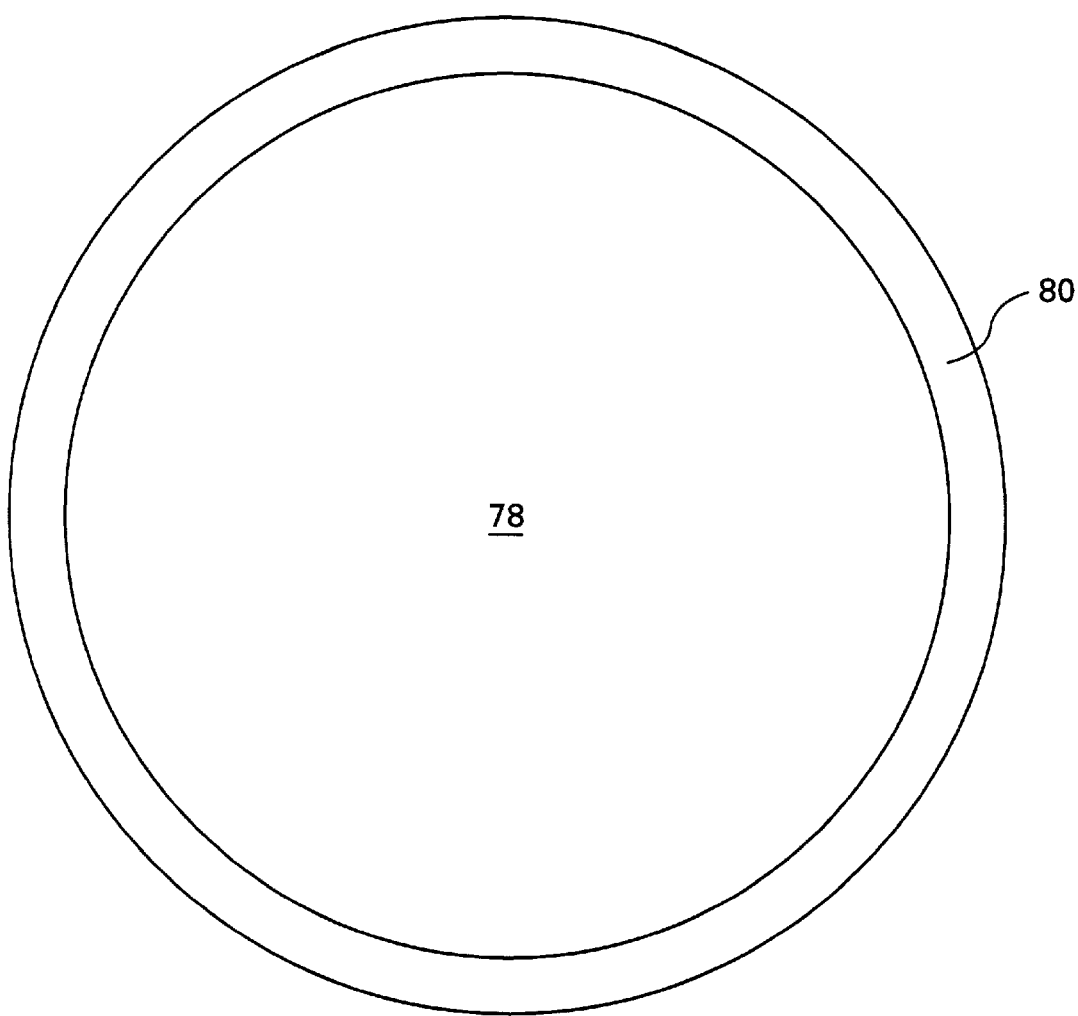
FIG. 18 is a top schematic illustration of a stuffed pizza crust in accordance with the present invention.

After the prebaked top crusts are disposed within the cavities 44 of the pizza pan 14, above the bottom crust dough and the shredded cheese or other filling, the pizza pan moves toward the third pan stop location 26 disposed beneath the top crust tamper 20. Referring to FIG. 17, the tamper 20 includes an air actuated tamping element 28 for each of the cavities 44 of the pizza pan 14. Each of the tamping elements 28, preferably five in accordance with the illustrated embodiment, includes a tamping head 72 attached to an air cylinder 74 mounted to an upper tamping plate 76, as shown in FIG. 16. The stroke and air pressure to each air cylinder 74 may be adjusted to control the depth of travel and pressure which is applied to the prebaked crust in each of the cavities, which in turn-dictates how far the prebaked crust is pressed into the shredded cheese and bottom crust dough. At the preferred settings, the top crust is pressed evenly into the bottom crust dough and the dough of the bottom crust lip is squeezed over the prebaked top crust, thereby causing the bottom crust dough to seal against the prebaked top crust and encase the shredded cheese therebetween. In the illustrated embodiment, each tamping head 72 has a diameter of approximately nine and one-half inches to correspond to the approximately nine and seven-eighths inch diameter of each of the cavities 44. The tamping heads 72 of the illustrated embodiment exert a force of approximately eighty lbs/in$^2$ in order to effectively seal the peripheral flanged edge 84 of the bottom crust 80 with the peripheral edge of the top crust 78, as shown in FIG. 18.

In operation, the pizza pan is indexed to the third pan stop location 26. Air is then supplied to each of the air cylinders 74 to press the tamping heads 72 into the prebaked top crust. The air is then released from the air cylinders 74 to allow the tamping heads 72 to be withdrawn, and the pizza pan 14 is released from the third pan stop location 26.

Figure 19:
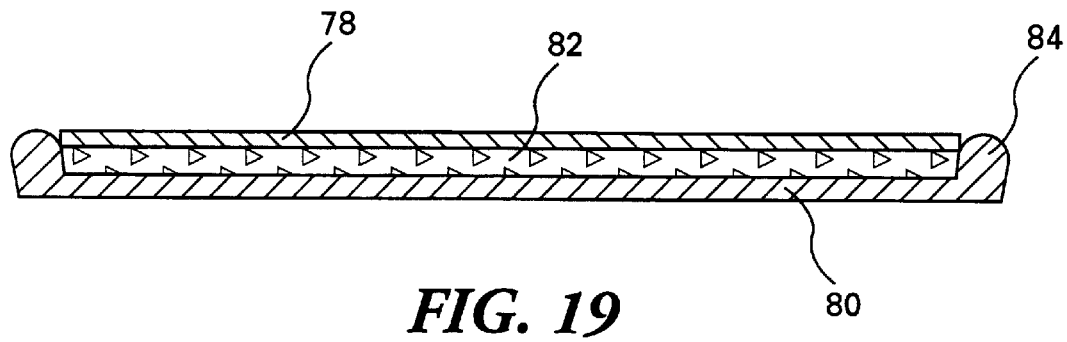
FIG. 19 is a cross-sectional view through the stuffed pizza crust shown in FIG. 18.

After the prebaked top crust 78 is pressed into the flanged peripheral edge 84 of the bottom crust dough 80, and the shredded cheese 82 is encased therebetween, as shown in FIG. 19, the bottom crust dough/shredded cheese/prebaked top crust assembly is baked, removed from the pizza pan, cooled and packaged, in a conventional manner known in the art. The resulting pizza crust of the present invention thus provides a pizza crust with a shredded cheese or other filling disposed throughout substantially the entire extent of the crust. The chosen conventional pizza toppings of sauce, cheese, and other vegetables or meats, are applied on top of the stuffed pizza crust of the present invention in order to provide a unique and appealing pizza. The final pizza and/or the pizza crust alone may easily be frozen or refrigerated for future use.

It should now be apparent that a new, useful and unobvious stuffed pizza crust and the method and apparatus for making the same has been described which overcomes problems of the type noted in connection with the prior art and which increases the edible appeal of the final pizza product. It will also be apparent to those skilled in the art that numerous modifications, variations, substitutions, and equivalents exist for the stuffed pizza crust described above. For example, although described with respect to the preferred embodiment utilizing an unbaked bottom crust and a prebaked top crust, it should be apparent to those skilled in the art that the present invention may be modified to accommodate the reverse thereof, both crusts being unbaked, and/or both crusts being prebaked. Accordingly, it is expressly intended that all such modifications, variations, substitutions, and equivalents for features of the invention as defined in the appended claims be embraced thereby.

What is claimed is:

1. A method of making a stuffed pizza crust, said method comprising the steps of:

lining a pizza pan with a bottom layer of uncooked crust dough;

forming a flanged peripheral edge of uncooked dough extending around a perimeter portion of said bottom layer;

applying a layer of edible filling material over said bottom layer of uncooked crust dough;

placing a pre-baked top crust, having a peripheral edge, over said layer of edible filling material and flanged peripheral edge of said bottom layer of uncooked crust dough; and sealing the overlaying peripheral edge of said pre-baked top crust to the flanged peripheral edge of said bottom layer of uncooked crust dough.

2. The method of claim 1 wherein said step of applying a layer of edible filling material includes distributing the layer of edible filling material in a layer having a substantially even thickness.

3. The method of claim 2 wherein said applying step includes distributing a layer of shredded cheese in a substantially even thickness over said bottom layer of uncooked crust dough.

4. The method of claim 1 wherein said step of placing said top pre-baked crust includes removing the pre-baked crust from a crust magazine and positioning the pre-baked crust on top of the layer of edible filling material and aligning the flanged peripheral edge of said bottom layer of uncooked crust dough with the peripheral edge of the top pre-baked crust.

5. The method of claim 1 wherein said sealing step includes tamping said peripheral edge of the pre-baked top crust downward into the flanged peripheral edge of said bottom layer of uncooked crust dough, thereby encasing said layer of edible filling material therebetween.

6. A method of making stuffed pizza crust, said method comprising the steps of:

lining a pizza pan with a bottom layer of uncooked crust dough;

forming a flanged peripheral edge of uncooked crust dough;

applying a layer of edible filling material having substantially even thickness over said bottom layer of uncooked crust dough;

removing a pre-baked crust having a peripheral edge from a crust magazine by suction means for lifting, transporting and positioning the pre-baked crust;

placing the pre-baked top crust over said layer of edible filling material and flanged peripheral edge of said bottom layer of uncooked crust dough; and sealing the overlaying peripheral edge of said pre-baked top crust downward into the flanged peripheral edge of said bottom layer of uncooked crust dough to enclose said layer of edible filling material therein.

* * * * *